(12) United States Patent
Shi et al.

(10) Patent No.: US 10,021,625 B1
(45) Date of Patent: Jul. 10, 2018

(54) BROADCAST INFORMATION BLOCK ASSISTANCE FOR A WIRELESS DEVICE

(71) Applicant: Apple Inc., Cupertino, CA (US)

(72) Inventors: Jianxiong Shi, Dublin, CA (US); Madhusudan Chaudhary, Campbell, CA (US); Srinivasan Nimmala, San Jose, CA (US); Srirang A. Lovlekar, Cupertino, CA (US); Venkateswara Rao Manepalli, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/584,123

(22) Filed: May 2, 2017

(51) Int. Cl.
*H04W 4/00* (2018.01)
*H04W 48/10* (2009.01)
*H04W 76/02* (2009.01)
*H04W 76/14* (2018.01)

(52) U.S. Cl.
CPC ......... *H04W 48/10* (2013.01); *H04W 76/023* (2013.01); *H04W 76/14* (2018.02)

(58) Field of Classification Search
CPC .... H04W 48/10; H04W 76/023; H04W 24/02
USPC ......................................................... 455/434
See application file for complete search history.

(56) References Cited

U.S. PATENT DOCUMENTS

| 6,628,946 | B1 * | 9/2003 | Wiberg | H04W 48/12 |
| | | | | 370/331 |
| 7,444,142 | B2 * | 10/2008 | Roberts | H04W 48/16 |
| | | | | 455/418 |
| 2006/0166693 | A1 * | 7/2006 | Jeong | H04W 48/16 |
| | | | | 455/525 |
| 2009/0316603 | A1 * | 12/2009 | Amerga | H04W 48/08 |
| | | | | 370/254 |
| 2011/0171929 | A1 * | 7/2011 | Tamura | H04W 48/12 |
| | | | | 455/404.1 |
| 2012/0163305 | A1 * | 6/2012 | Nimbalker | H04W 52/0206 |
| | | | | 370/329 |
| 2013/0114566 | A1 | 5/2013 | Awoniyi et al. | |
| 2013/0301525 | A1 | 11/2013 | Xu et al. | |
| 2013/0308497 | A1 | 11/2013 | Novak et al. | |
| 2014/0169284 | A1 | 6/2014 | Cai et al. | |
| 2016/0174135 | A1 * | 6/2016 | Yan | H04W 48/12 |
| | | | | 455/434 |

* cited by examiner

*Primary Examiner* — William Nealon
(74) *Attorney, Agent, or Firm* — Meyertons Hood Kivlin Kowert & Goetzel, P.C.; Jeffrey C. Hood; Joel L. Stevens

(57) ABSTRACT

This disclosure relates to broadcast information block assistance for a wireless device. The wireless device may obtain a first plurality of broadcast information blocks from a first base station. The wireless device may receive a second plurality of broadcast information blocks associated with the first base station from a source other than the first base station. The wireless device may determine if the second plurality of broadcast information blocks match the first plurality of broadcast information blocks based on version information specified in the first plurality of broadcast information blocks. When the broadcast information blocks match, the wireless device may use the first and second pluralities of broadcast information blocks to perform communication with the first base station without obtaining the second plurality of information blocks from the first base station.

20 Claims, 5 Drawing Sheets

BROADCAST INFORMATION BLOCK ASSISTANCE FOR A WIRELESS DEVICE

TECHNICAL FIELD

The present application relates to wireless communication, including to techniques for broadcast information block assistance for a wireless device.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and typically have smaller batteries than larger portable devices, such as smart phones and tablets. In general, it would be desirable to reduce the power requirements of communication devices. Therefore, improvements in the field are desired.

SUMMARY

Embodiments are presented herein of, inter alia, systems, apparatuses, and methods for broadcast information block assistance for a wireless device.

The wireless device may be a link budget limited device, such as an accessory device with a relatively limited communication range, e.g., due to device design constraints. Because of the relatively limited communication range of the wireless device, cellular communication service coverage for the wireless device may not be as widespread as for many other wireless devices, which may in turn result in the wireless device experiencing less cellular communication capabilities than a wireless device with greater communication range. For example, the wireless device may have a greater difficulty in obtaining or decoding broadcast information blocks (BIBs), such as master information blocks (MIBs), scheduling blocks (SBs), and/or system information blocks (SIBs), e.g., than a wireless device with a greater communication range.

Accordingly, the wireless device may decode or obtain a first set of BIBs from a base station, e.g., one that the wireless device intends to or is camping on. In one embodiment, this first set of BIBs may be ones that change relatively frequently. For example, the first set of BIBs may include an MIB as well as one or more important SIBs. In some embodiments, the first set of BIBs may include SBs.

However, the wireless device may a second set of BIBs in order to camp on or otherwise operate with the base station; however, rather than attempting to obtain or decode this second set of BIBs from the base station, the wireless device may retrieve them from a different source, thereby avoiding having to attempt to decode them, which may be an error prone and/or power intensive process, e.g., based on the wireless device being a link budget limited device.

For example, the wireless device may have already obtained the second set of BIBs at a prior time and may have stored the second set of BIBs in memory. In one embodiment, the wireless device may have obtained these second BIBs from the base station. Alternatively, in the case that the wireless device has a companion device (e.g., if the wireless device is an accessory device to the companion device, such as a cell phone), the companion device may obtain the second set of BIBs and provide them to the wireless device, e.g., at a previous time or at the time that the wireless device obtained the first set of BIBs. The wireless device may then use the first and second BIBs to communicate and/or operate with the base station, without obtaining the second BIBs from the base station at the time of obtaining the first BIBs.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
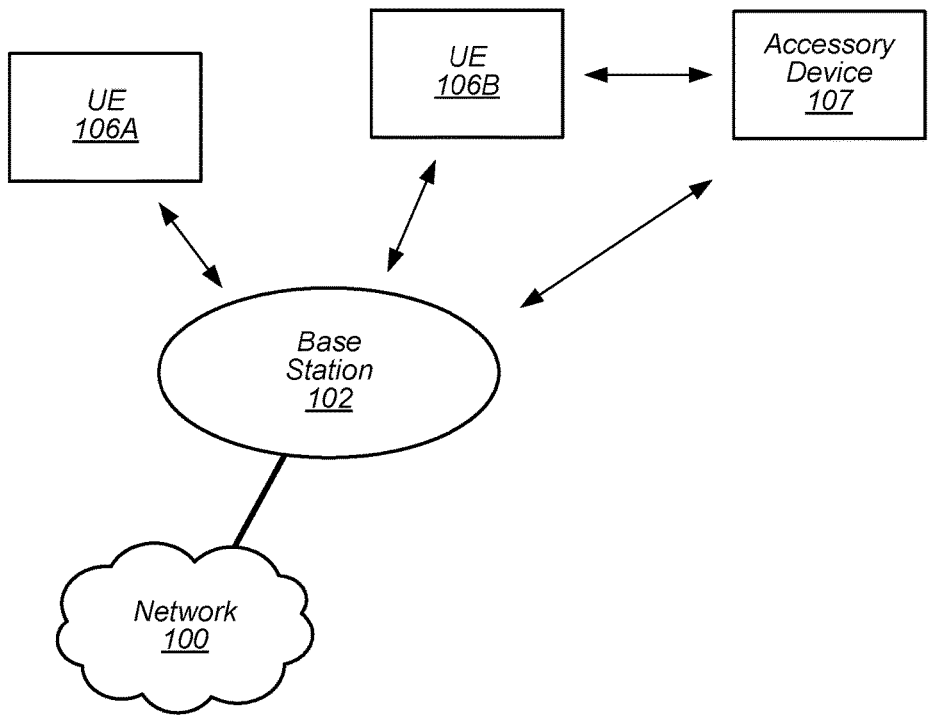
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. The UE 106B may be configured to communicate with the UE device 107, which may be referred to as an accessory device 107, while the UE 106B associated with the accessory device 107 may be referred to as a companion device to the accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of its companion device (e.g., UE 106B) to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

Figure 2:
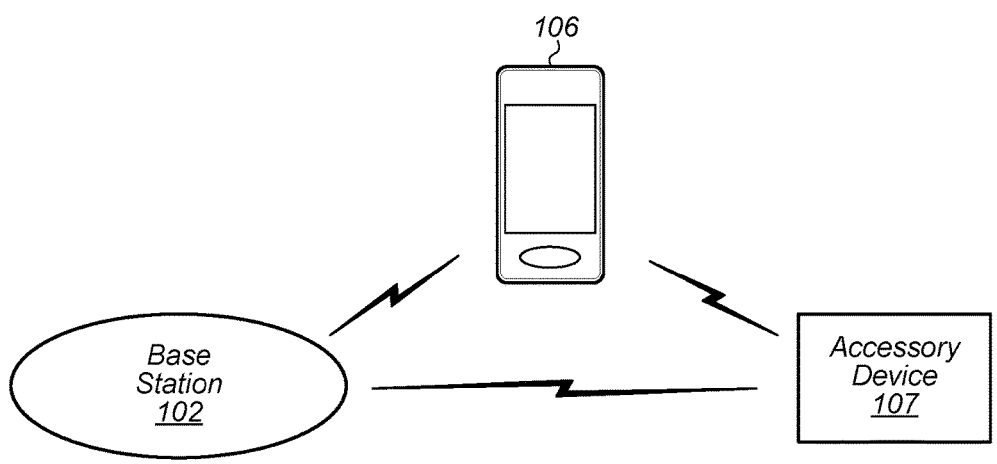
FIG. 2 illustrates an example system where an accessory device can selectively either directly communicate with a cellular base station or utilize the cellular capabilities of an intermediate or proxy device such as a smart phone, according to some embodiments.

FIG. 2 illustrates an example accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device, intermediate device, or companion device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of handheld device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include a device or integrated circuit for facilitating cellular communication, referred to as a cellular modem. The cellular modem may include one or more processors (processor elements) and various hardware components as described herein. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106 or 107 might be configured to communicate using a single shared radio. The shared radio may couple to a single antenna, or may couple to multiple antennas (e.g., for MIMO) for performing wireless communications. Alternatively, the UE device 106 or 107 may include two or more radios. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. As previously noted, when the UE 106 is capable of being used by the accessory device 107 as a proxy, the UE 106 may be referred to as a companion device to the accessory device 107.

Figure 3:
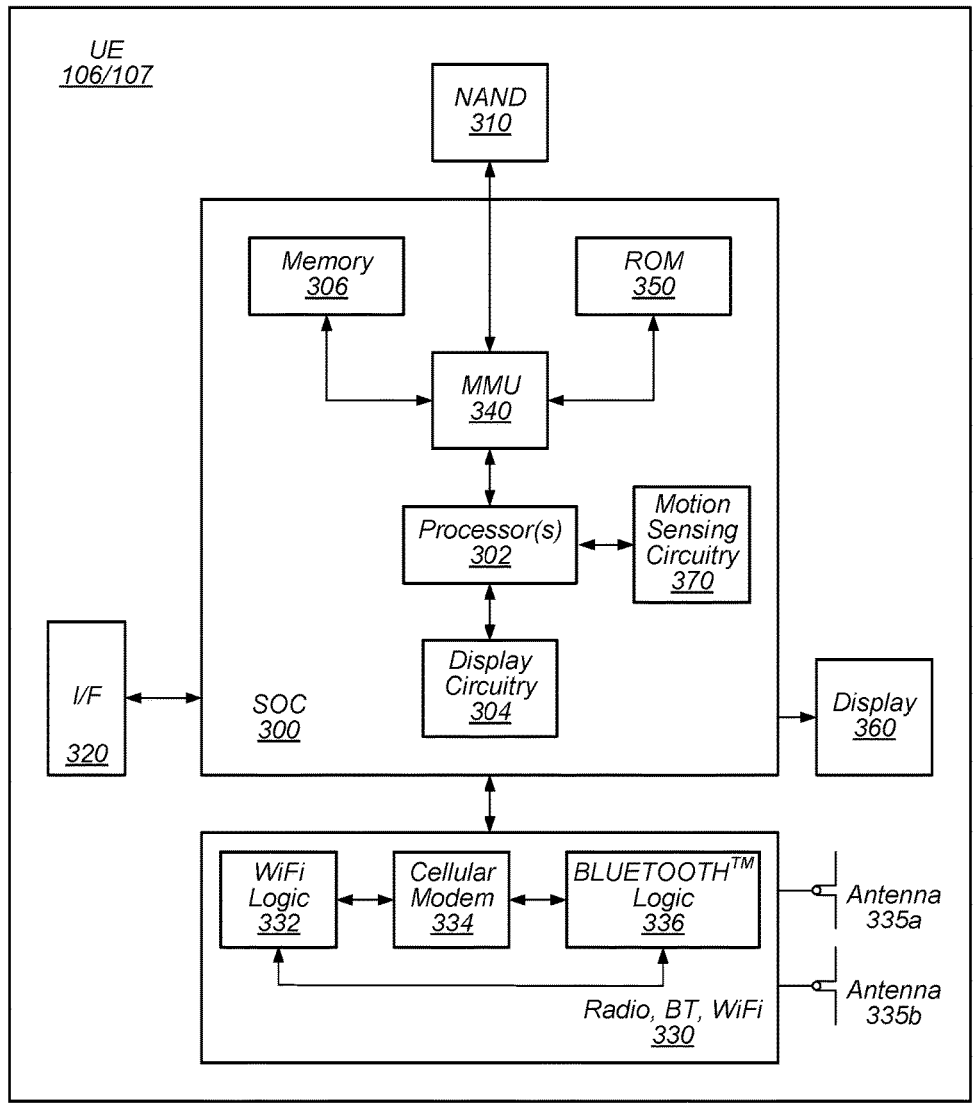
FIG. 3 is a block diagram illustrating an example wireless device, according to some embodiments.

FIG. 3—Example Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., Wi-Fi logic 332, cellular modem 334, BT logic 336) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
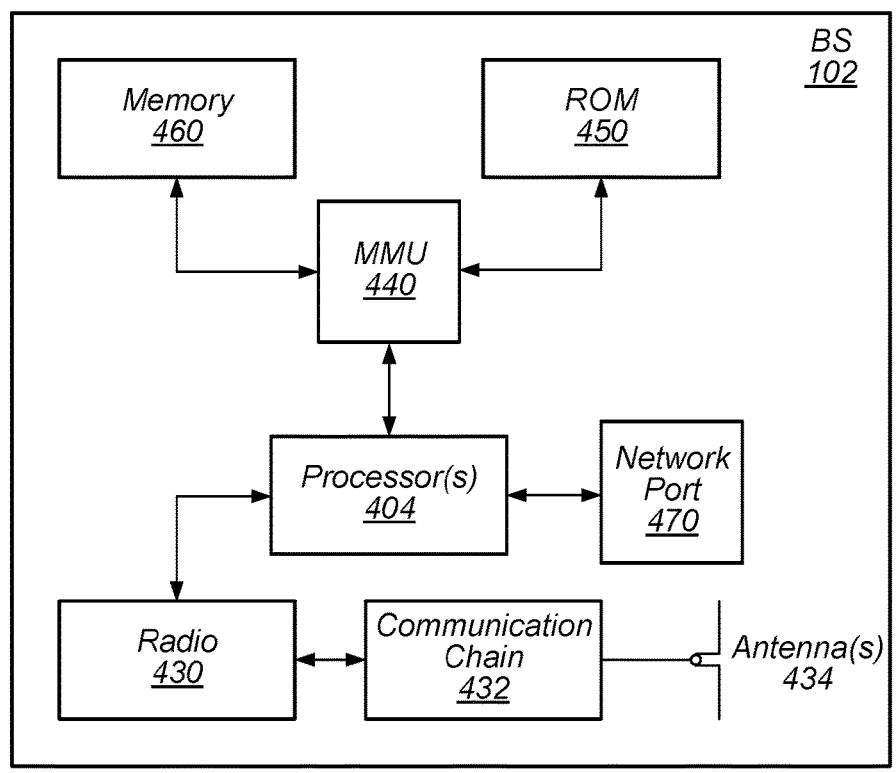
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Broadcast Information Block Assistance

As noted above, a wireless device may be a link budget limited device, such as an accessory device with a relatively limited communication range, e.g., due to device design constraints. Because of the relatively limited communication range of the wireless device, cellular communication service coverage for the wireless device may not be as widespread as for many other wireless devices, which may in turn result in the wireless device experiencing less cellular communication capabilities than a wireless device with greater communication range.

Figure 5:
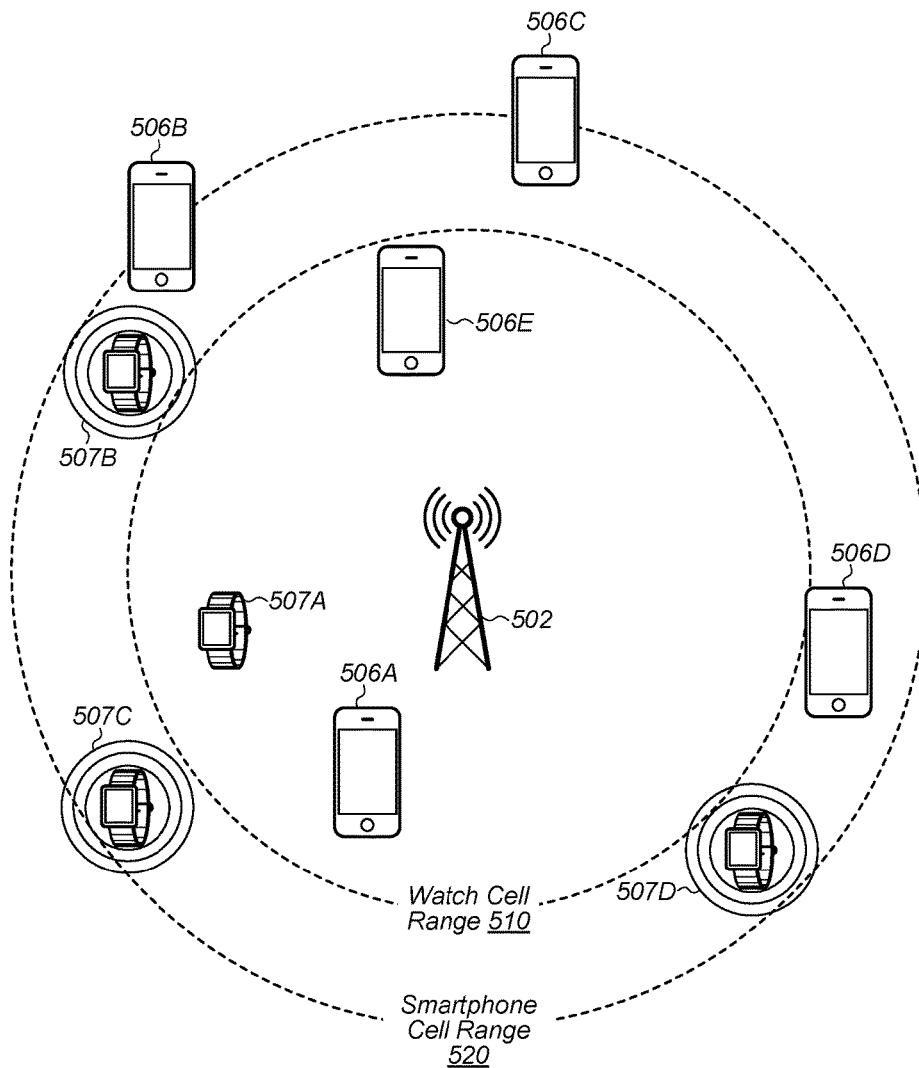
FIG. 5 illustrates a possible example coverage scenario for smartphones and smart watches, according to some embodiments.

FIG. 5 illustrates one possible example of a coverage scenario for smartphones (an exemplary companion device) and smart watches (an exemplary accessory device), according to some embodiments. As shown, a base station 502 may provide a cell for a variety of wireless devices, including various smartphones 506 and various smart watches 507. As previously discussed, such different types of devices may have differing characteristics that result in different effective communication ranges. Thus, as shown, the effective watch cell range 510 may be smaller than the effective smartphone cell range 520. As a result, while all of the illustrated smartphones (506A, 506B, 506C, 506D, 506E) may be have good communication quality with the base station 502, only one of the illustrated smart watches (507A) may enjoy similar communication quality, and the remainder of the illustrated smart watches (507B, 507C, 507D) may have lower communication quality (e.g., and may be outside of communicative range of the base station 502).

Accordingly, some wireless devices, such as the smart watches 507 shown in FIG. 5, may have a greater difficulty in obtaining or decoding information transmitted by the base station 502. In particular, these wireless devices may face challenges when attempting to camp on cells in certain marginal coverage scenarios. For example, the base station may broadcast certain information that may be usable for wireless devices to camp on or otherwise communicate with the base station 502. This broadcasted information may include broadcast information blocks (BIBs), such as master information blocks (MIBs), scheduling blocks (SBs), and/or system information blocks (SIBs). In long term evolution (LTE), the wireless device may need to decode information from the MIB as well as SIB1 and SIB2 in order to camp on a cell. These BIBs may identify useful information, such as cell information (e.g., cell ID, PLMN ID, etc.), version information, channel bandwidth, PHICH (physical hybrid-arq indicator channel) configuration details, transmit power, number of antennas, SIB scheduling information, etc. The MIB may be broadcast in a PBCH (physical broadcast channel) and the SIBs may be broadcast in a PDSCH (physical downlink shared channel). In addition, the wireless device may need to decode information from SIB3, SIB4, SIB5, and SIB6 in order to operate within LTE on the cell. These additional BIBs may identify information such as neighbor cell information, inter-RAT information, common information, etc. In WCDMA (wideband code division multiple access), the wireless device may need to decode the MIB, SB1, SB2, SIB1, SIB3, SIB5, and SIB7 to camp on a cell. Additionally, the wireless device may need to decode SIB11 and SIB19 to operate on the WCDMA cell. Thus, wireless devices, such as smart watches 507, may have greater difficulty decoding these BIBs, e.g., while near the cell range 510, versus other wireless devices, such as smart phones 506. This difficulty may be further exacerbated, e.g., when the wireless device is in marginal conditions, it may take a long time to decode these BIBs, which can be very power consuming, particularly when the BIBs are large (e.g., SIB11 in WCDMA can take as long as 16 segments to be received).

Thus, for the wireless device to successfully camp, it may need to decode the mandatory BIBs in a stipulated amount of time. If it is unable to detect and decode them within this time, camping may fail and the wireless device may not get cellular service. For link budget limited devices, such as smart watches 507, it is possible that they may spend a large amount of time (e.g., a majority amount of time) in marginal conditions and may face camping problems due to not being able to decode some or all of the BIBs. Moreover, reading the BIBs consumes power, and even more so when experiencing these marginal conditions.

Accordingly, a wireless device (e.g., a smart watch 507) may decode or obtain a first set of BIBs from the base station (e.g., the base station 502) that the wireless device intends to or is camping on. In one embodiment, this first set of BIBs may be ones that change or are updated relatively frequently. However, as noted above the wireless device may need a second set of BIBs in order to camp on or otherwise operate with the base station; however, rather than attempting to obtain or decode this second set of BIBs from the base station, the wireless device may retrieve them from a different source, thereby avoiding having to attempt to decode them, which may be an error prone and/or power intensive process, e.g., based on the wireless device being a link budget limited device.

For example, the wireless device may have already obtained the second set of BIBs at a prior time and may have stored the second set of BIBs in memory. In one embodiment, the wireless device may have obtained these second BIBs from the base station. For example, the wireless device may be configured to save BIBs (e.g., in a local database) for a cell whenever it camps on a cell. In some embodiments, the memory may be a volatile memory (e.g., associated with the baseband of the wireless device). Accordingly, when the baseband state is changed to a low power mode or is powered off, the wireless device may store the BIBs to a non-volatile memory. Then, when the baseband is powered back on, these BIBs may be restored from the non-volatile memory to the volatile memory (e.g., in the local database). Thus, the wireless device may be configured to save at least some of the BIBs associated with the base station for later use. Note that the wireless device may store all of the BIBs for the base station, or just the second set of BIBs (e.g., since the first set of BIBs may be decoded each time). Note further that the wireless device may perform this storage and retrieval for each of a plurality of base stations.

Alternatively, or additionally, in the case that the wireless device has a companion device (e.g., if the wireless device is an accessory device to the companion device, such as a cell phone), the companion device may obtain the second set of BIBs and provide them to the wireless device, e.g., at a previous time or at the time that the wireless device obtained the first set of BIBs. For example, the companion device may store the BIBs (e.g., all or the second set of BIBs) for each of a plurality of base stations. Then, when the companion device is able to communicate with the wireless device (e.g., is within wireless proximity to the wireless device or is otherwise able to transfer the BIBs, e.g., over a wide area network), these BIBs may be transferred to the wireless device. In some embodiments, the BIBs may be provided to the wireless device according to an abstract syntax notation (ASN). The wireless device (e.g., the accessory device) may then store the transferred BIBs in a memory and use them as necessary, e.g., similar to embodiments discussed above.

Thus, the wireless device may then use the first and second BIBs to communicate and/or operate with the base station, without obtaining the second BIBs from the base station at the time of obtaining the first BIBs.

It should be noted that while the above is described as being directed to accessory devices or link budget limited devices, such techniques may also be beneficial to non-link budget limited wireless devices (e.g., including wireless devices with larger cellular communication ranges, such as the smartphones illustrated in FIG. 5), and may also or alternatively be used in conjunction with such devices if desired.

FIG. 6—Flowchart

Figure 6:
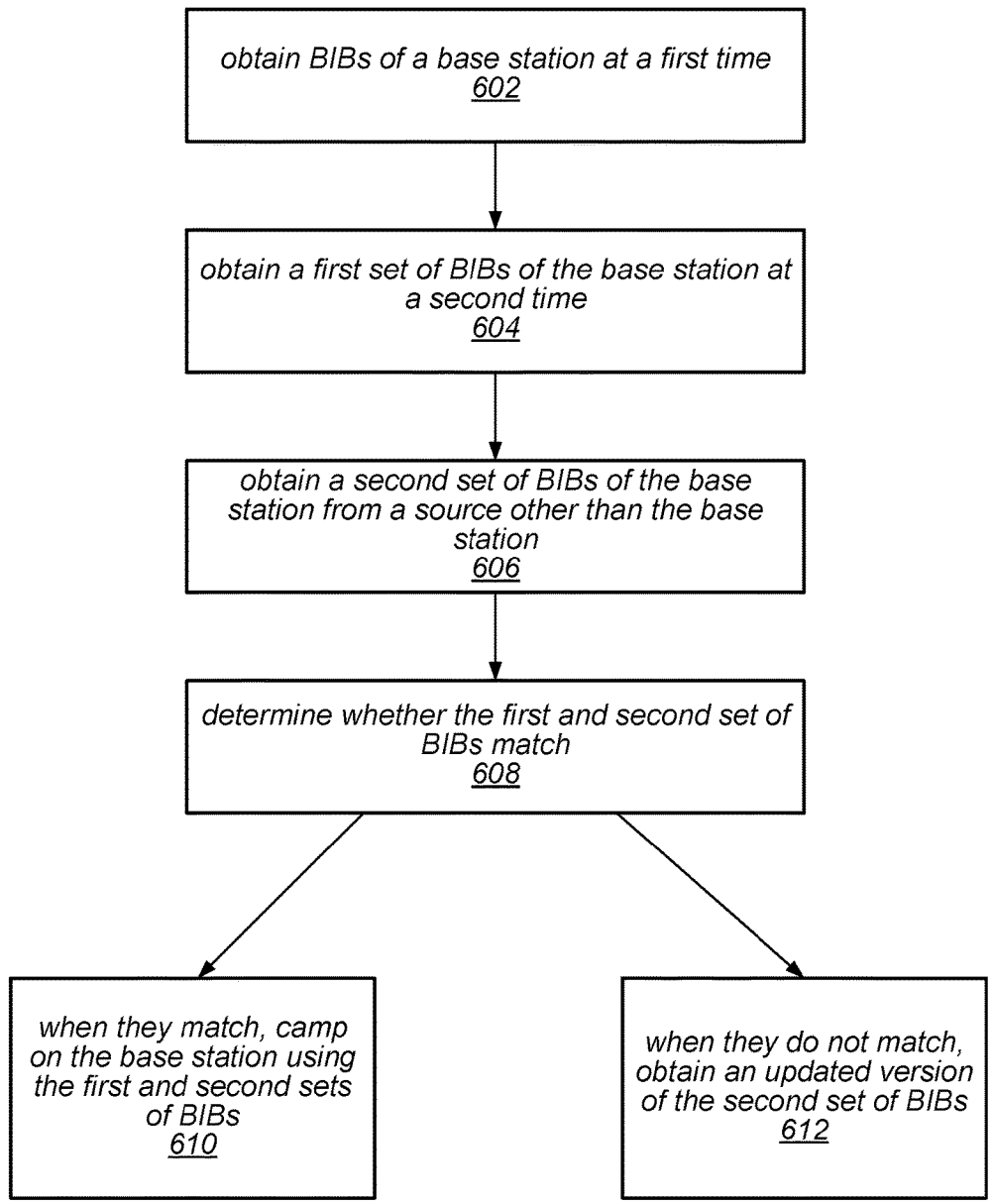
FIG. 6 is a flowchart diagram illustrating an exemplary method for a wireless device to obtain and use broadcast information blocks, according to some embodiments.

FIG. 6 is a flowchart diagram illustrating a method for a wireless device (e.g., an accessory device) to obtain and use BIBs of a base station, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 6 may be implemented by a wireless device, such as a UE 106 or 107 illustrated in and described with respect to FIGS. 1-3, or more generally in conjunction with any of the computer systems or devices shown in the above Figures, among other devices, as desired. As shown, the method may operate as follows.

In 602, the wireless device may obtain and store BIBs for a base station.

In one embodiment, the wireless device obtain the BIBs from the base station, e.g., when the wireless device is under a good quality communication scenario and/or has a threshold level of battery power. For example, the wireless device may decode both a first set of BIBs and a second set of BIBs broadcast by the base station, e.g., and may use those BIBs to camp on the first base station at that time. The wireless device may then store at least the second set of BIBs in memory, for later use. For example, the wireless device may store the BIBs (e.g., only the second set of BIBs or all of the BIBs) in a local database. In some embodiments, the local database may be stored in volatile memory, but may be backed up to non-volatile memory in order to persist across reboots or baseband power downs (e.g., the local database may be stored in the non-volatile memory during power down and restored from the non-volatile memory upon reboot and/or the baseband powering back up).

Alternatively, or additionally, the wireless device may obtain the BIBs from another device. For example, as noted above, the wireless device may be a link budget limited device or an accessory device. In one embodiment, the wireless device may be configured to receive BIBs from a companion device, such as a cell phone. Similar to above, the companion device may have obtained the BIBs from the base station and may have stored the BIBs, e.g., for itself or for transfer to the wireless device. Also similar to the wireless device, the companion device may store at least the second set of BIBs (or all of the BIBs, if desired) in a local database (e.g., potentially stored in non-volatile memory to persist across power downs, similar to the wireless device discussed above). The companion device may then transfer the BIBs for the base station (and/or any number of base stations) to the wireless device, e.g., using an ASN format. In some embodiments, the transfer may be performed using a short-range wireless protocol, such as Bluetooth or WLAN. Alternatively, or additionally, the transfer could occur over a larger network, e.g., using a wide area network such as the Internet. The wireless device can then store the BIBs (e.g., at least the first set of BIBs) in memory, similar to discussions above. Note that the wireless device may store self-obtained BIBs differently (e.g., in a different database) than those obtained from another device (e.g., from the companion device). Alternatively, both types of obtained BIBs may be stored in the same location or same manner, as desired.

Thus, in 602, the wireless device may at least store the second set of BIBs for the base station at a first time.

In 604, the wireless device may obtain the first set of BIBs from the base station. For example, at a separate time after 602, the wireless device may be within a cell range of the base station. Note that the second time may be any of various lengths of time apart from the first time, e.g., an hour, a day, multiple days, etc. In one embodiment, the second time may be a period after the first time, such that the wireless device has handed over to a different base station, powered down, gone to sleep, etc., such that the first set of BIBs could no longer be safely considered usable or were "stale" (e.g., based on an expiration threshold of time).

Rather than using the time or power required to obtain the second set of BIBs from the base station, in 606, the wireless device may obtain them from a source other than the base station, at the second time. Note that the wireless device may obtain the second set of BIBs from another source based on various conditions, e.g., cell coverage conditions, channel quality conditions, base station signal strength, remaining battery power, etc., using various thresholds. Alternatively, the wireless device may obtain or use the second set of BIBs from the other source regardless of conditions, e.g., as it may generally be more power efficient.

In particular, in one embodiment, the wireless device may retrieve the second set of BIBs from a memory of the wireless device (e.g., the local database discussed above). As noted above, these BIBs may have been stored in the memory after the wireless device obtained them from the base station at the earlier time or they may have been provided to the wireless device from another device, such as a companion device.

As another possibility, the wireless device may be configured to request at least the second set of BIBs (or perhaps all of the BIBs) from the companion device if it is within proximity to the wireless device. For example, if the wireless device and the companion device are coupled to each other, or close enough to communicate to each other (e.g., over Bluetooth or WLAN), the wireless device may be configured to request that the companion device obtain and provide necessary BIB(s) to the wireless device, as needed.

In 608, the wireless device may determine if the second set of BIBs match the first set of BIBs. For example, the first set of BIBs may specify version information, e.g., within the MIB. In one embodiment (e.g., in LTE), one of the first BIBs (e.g., the SIB1) may have a value tag or counter that indicates the current counter value of the BIB and the other SIBs. Accordingly, the wireless device may compare the counter value of the BIB with the counter value of the SIB(s) of the second set of BIBs. When the two counter values match, then the wireless device may be able to use the second set of BIBs without obtaining newer versions.

As another possibility (e.g., in WCDMA), one or more of the first set of BIBs (e.g., the MIB, SB1/2) may list version information (e.g., counter values) for a plurality of the BIBs in the second set. Accordingly, the wireless device may compare the version information for each of the BIBs specified in the first set of BIBs against the version information of each of the corresponding BIBs in the second set of BIBs. For example, the MIB may list a counter value of 8 for SIB3, which the wireless device can then compare against the counter value of the SIB3 it has stored. Similarly, the MIB may list a counter value of 10 for SIB5, which the wireless device can then compare against the counter value of the SIB5 it has stored.

Other version information may be used instead of counter values, such as time stamps, numbers other than counter values, representative data points, etc. In some embodiments, not all of the BIBs may have version information, e.g., SIB7. In these instances, they may be included in the first set of BIBs.

In 610, if the first and second sets of BIBs match, the wireless device may use them to camp on the base station and/or otherwise perform necessary communication protocol steps. Alternatively, in 612, if the first and second sets of BIBs do not match, the wireless device may obtain the mismatched (or all of the second set of BIBs) from the base station. As another possibility, the wireless device may request that the companion device obtain and provide an updated version of the second set of BIBs to the wireless device.

Note that various ones of the steps above may be performed in a different order or modified, as desired. For example, in embodiments where the companion device provides the second set of BIBs (or all of the BIBs) at or near the same time that the wireless device obtains the first set of BIBs from the base station, step 602 may not be necessary. Other modifications are also envisioned.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
one or more processing elements, wherein the one or more processing elements are configured to:
obtain a first plurality of broadcast information blocks from a first base station;
receive a second plurality of broadcast information blocks associated with the first base station, wherein said receiving the second plurality of broadcast information blocks is from a source other than a base station, and wherein at least a subset of the second plurality of broadcast information blocks are different than the first plurality of broadcast information blocks;
determine if the second plurality of broadcast information blocks correspond to the first plurality of broadcast information blocks based on version information specified in the first plurality of broadcast information blocks;
when the second plurality of broadcast information blocks correspond to the first plurality of broadcast information blocks, use the first and second pluralities of broadcast information blocks to perform communication with the first base station without obtaining the second plurality of information blocks from the first base station.

2. The apparatus of claim 1, wherein the one or more processing elements are further configured to:
when the second plurality of broadcast information blocks do not correspond to the first plurality of broadcast information blocks, obtaining the second plurality of broadcast information blocks from the first base station.

3. The apparatus of claim 1, wherein the apparatus is comprised in an accessory device, wherein said receiving the second plurality of information blocks comprises receiving the second plurality of information blocks from a companion device, wherein the companion device is separate from the accessory device.

4. The apparatus of claim 1, wherein the one or more processing elements are further configured to:
obtain the second plurality of broadcast information blocks from the first base station at a first time;
store the second plurality of broadcast information blocks in memory;
wherein said obtaining the first plurality of broadcast information blocks is performed at a second time, after the first time;
wherein receiving the second plurality of broadcast information blocks comprises retrieving the second plurality of broadcast information blocks from memory.

5. The apparatus of claim 1, wherein the first plurality of broadcast information blocks comprises at least a master information block (MIB) and a system information block (SIB) transmitted by the first base station on a broadcast channel.

6. The apparatus of claim 1, wherein the first base station is a long term evolution (LTE) base station, wherein the first plurality of broadcast information blocks comprises a master information block (MIB) and a system information block 1 (SIB1).

7. The apparatus of claim 6, wherein the second plurality of broadcast information blocks comprise SIB2, SIB3, SIB4, SIB5, and SIB6.

8. The apparatus of claim 1, wherein the first plurality of broadcast information blocks comprises a master information block (MIB), a scheduling block (SB) 1, an SB2, and a system information block (SIB) 7.

9. The apparatus of claim 8, wherein the second plurality of broadcast information blocks comprises SIB1, SIB3, SIB5, SIB11, and SIB19.

10. A method, comprising:
at an accessory device:
decoding a first plurality of broadcast information blocks from a first base station;
receiving a second plurality of broadcast information blocks associated with the first base station, wherein said receiving the second plurality of broadcast information blocks is from a companion device separate from the accessory device;
determining if the second plurality of broadcast information blocks correspond to the first plurality of broadcast information blocks based on version information specified in the first plurality of broadcast information blocks;
when the second plurality of broadcast information blocks correspond to the first plurality of broadcast information blocks, using the first and second pluralities of broadcast information blocks to perform communication with the first base station without decoding the second plurality of information blocks from the first base station.

11. The method of claim 10, wherein said receiving the second plurality of broadcast information blocks is performed at a first time, wherein said decoding the first plurality of broadcast information blocks is performed at a second, later time, wherein the method further comprises:
storing the second plurality of broadcast information blocks in a first memory; and
retrieving the second plurality of broadcast information blocks from the first memory in response to decoding the first plurality of broadcast information blocks from the first base station.

12. The method of claim 11, further comprising:
storing the second plurality of broadcast information blocks in a non-volatile memory; and
restoring the second plurality of broadcast information blocks to the first memory from the non-volatile memory.

13. The method of claim 10, wherein said determining if the second plurality of broadcast information blocks correspond to the first plurality of broadcast information comprises:
determining a version value from a broadcast information block of the first plurality of broadcast information blocks;
determining a version value from a system information block (SIB) of the second plurality of broadcast information blocks; and
comparing the version value of the broadcast information block with the version value of the SIB.

14. The method of claim 10, wherein the first plurality of information blocks comprises a master information block (MIB) and a system information block (SIB).

15. The method of claim 10, wherein the second plurality of information blocks comprises a plurality of system information blocks (SIBs).

16. The method of claim 10, wherein the first plurality of information blocks comprises at least a master information block (MIB), a scheduling block (SB), and a system information block (SIB), wherein the second plurality of information blocks comprises at least a plurality of SIBs.

17. A wireless device, comprising:
wireless communication circuitry; and
one or more processing elements coupled to the wireless communication circuitry, wherein the one or more processing elements are configured to:
  obtain a plurality of broadcast information blocks from a first base station using the wireless communication circuitry, wherein the plurality of broadcast information blocks comprise a first subset and a second subset, wherein the first and second subsets do not overlap;
  perform communication with the first base station using the wireless communication circuitry;
  provide the second subset of the plurality of broadcast information blocks to an accessory device, wherein the accessory device is configured to use the second subset of the plurality of broadcast information blocks to communicate with the first base station without the accessory device obtaining the second subset of the plurality of broadcast information blocks from the first base station.

18. The wireless device of claim 17, wherein the wireless device provides the second subset of the plurality of broadcast information blocks without the first subset of the plurality of broadcast information blocks.

19. The wireless device of claim 17, wherein the second subset of the plurality of broadcast information blocks comprise a plurality of system information blocks (SIBs).

20. The wireless device of claim 17, wherein the first subset of the plurality of broadcast information blocks comprise at least a master information block (MIB) and a system information block (SIB).

* * * * *